United States Patent
Gibbs (12)

(10) Patent No.: US 6,886,837 B2
(45) Date of Patent: May 3, 2005

(54) HYDRAULIC SUSPENSION STRUT FOR AN AMPHIBIOUS VEHICLE

(75) Inventor: Alan Timothy Gibbs, London (GB)

(73) Assignee: Gibbs Technologies Limited (GB)

( * ) Notice: Subject to any disclaimer, the term of this patent is extended or adjusted under 35 U.S.C. 154(b) by 55 days.

(21) Appl. No.: 10/240,080

(22) PCT Filed: Mar. 26, 2001

(86) PCT No.: PCT/GB01/01334

§ 371 (c)(1),
(2), (4) Date: Sep. 24, 2002

(87) PCT Pub. No.: WO01/74612

PCT Pub. Date: Oct. 11, 2001

(65) Prior Publication Data

US 2003/0047899 A1 Mar. 13, 2003

(30) Foreign Application Priority Data

Mar. 30, 2000 (GB) .............................. 0007625

(51) Int. Cl.$^7$ ................................................. B60F 3/00
(52) U.S. Cl. ................. 280/43.17; 180/209; 440/12.52; 280/124.161; 280/124.16
(58) Field of Search ........................... 280/6.154, 6.155, 280/43.17, 124.157–124.16, 5.514, 5.519; 180/209; 114/344; 440/12.5, 12.51–12.54; B60F 3/00

(56) References Cited

U.S. PATENT DOCUMENTS

| | | | | |
|---|---|---|---|---|
| 2,350,037 A | * | 5/1944 | Hofheins et al. ......... | 440/12.53 |
| 3,299,978 A | * | 1/1967 | Sponsler .................... | 180/9.52 |
| 3,446,175 A | * | 5/1969 | Boehler et al. ............ | 180/121 |
| 3,550,993 A | * | 12/1970 | Peiffer ..................... | 280/6.159 |
| 4,145,073 A | * | 3/1979 | McLuckie et al. .... | 280/124.101 |
| 4,397,473 A | * | 8/1983 | Miles et al. .................. | 280/64 |
| 4,761,017 A | * | 8/1988 | Claux .................. | 280/124.126 |
| 4,779,895 A | | 10/1988 | Rubel ......................... | 280/707 |
| 4,798,398 A | | 1/1989 | Cummins .................... | 280/708 |
| 5,449,194 A | * | 9/1995 | Wernimont et al. ...... | 280/6.153 |
| 5,531,179 A | | 7/1996 | Roycroft et al. ............ | 114/270 |
| 5,570,653 A | * | 11/1996 | Gere et al. ................ | 440/12.51 |
| 5,584,498 A | | 12/1996 | Danek ......................... | 280/714 |
| 5,682,980 A | | 11/1997 | Reybrouck .................. | 280/714 |

FOREIGN PATENT DOCUMENTS

| | | |
|---|---|---|
| EP | 0 183 039 | 6/1986 |
| EP | 0 261 399 A1 | 3/1988 |
| FR | 2 692 203 A1 * | 12/1993 |
| GB | 1152200 | 5/1969 |
| GB | 1260719 | 1/1972 |
| GB | 2 134 052 A * | 8/1984 |
| GB | 2 144 378 A | 3/1985 |

OTHER PUBLICATIONS

The Search Report of the United Kingdom Patent Office dated Jun. 28, 2000.
International Search Report, Jun. 15, 2001.

* cited by examiner

*Primary Examiner*—Ruth Ilan
(74) *Attorney, Agent, or Firm*—Young & Basile, P.C.

(57) ABSTRACT

A hydraulic suspension strut (30) has a first on-off valve (58) connecting the first and second chambers (42 and 44), and a second on-off valve (62) connected to chamber (42) only. Suspension arm (3) of wheel (1) can be retracted beyond normal road travel, or protracted to road travel mode, by use of pump (9) and valves (58 and 62). The space in the strut above port (56) may be used as a hydraulic bump stop. An accumulator (50) may be included, as a hydraulic spring. Alternatively, strut (70) (FIG. 6; note alternative accumulator position) allows suspension to be raised above normal road travel. Strut (100) (FIG. 8) may be operated in roadgoing, raised, or retracted mode. These struts may be applied to reconfigurable suspensions; particularly for amphibious vehicles, which may require wheels to be withdrawn above the hull water line to reduce drag on water, particularly during cornering.

13 Claims, 11 Drawing Sheets

HYDRAULIC SUSPENSION STRUT FOR AN AMPHIBIOUS VEHICLE

BACKGROUND OF THE INVENTION

The present invention relates to an improved hydraulic suspension strut for use in a wheeled vehicle.

Known hydraulic suspension struts comprise a piston movable within a cylinder to achieve a damper effect, allowing the wheel mounted on the strut to move in the vertical direction. The damping effect is achieved by restricting the flow of hydraulic fluid from one side of the piston to the other. Often the hydraulic strut will be connected to a gas charged hydraulic accumulator to achieve a combined damper and spring effect in which the spring effect is achieved by compression of hydraulic fluid in the cylinder and fluid in the gas charged hydraulic accumulator. It is also known to provide a hydraulic bump stop in a hydraulic suspension system of this type, in which a volume of hydraulic fluid is contained within the cylinder and limits movement of the piston and hence the wheel, to the distance normal for road travel.

It is also known for road vehicles to use hydraulic suspensions comprising various valves and cross-connections between individual wheel suspensions, for example the BMC/British Leyland Hydrolastic and Hydragas systems. Such interconnected suspensions are disclosed in GB 2,144,378 (Alfa Romeo), GB 1,260,719 (IDCE), and U.S. Pat. No. 5,584,498 (Yamaha). These systems are designed to reduce undesirable effects such as pitch and roll; as are active and semi-active systems, which are known, for example, from U.S. Pat. No. 4,779,895 (Robert Bosch), EP 0,183,059 (Robert Bosch), and U.S. Pat. No. 5,678,846 (Lotus). All of these systems are designed to improve on-road performance, by extending the capabilities of a road car suspension.

It is further known, particularly on Citroen cars, for a road vehicle to have hydraulic suspension which can be raised above normal running height to traverse uneven ground. On the other hand, for amphibious vehicles, it has been found helpful to move the wheels in the opposite direction, retracting them well above road height to tuck them above the vehicle water line. This reduces drag on water, particularly during cornering. Suspensions allowing such reconfiguration are disclosed in EP 0,742,761 (Roycroft), U.S. Pat. No. 4,958,584 (Williamson), and U.S. Pat. No. 4,241,686 (Westphalen). Roycroft uses a combined hydraulic and mechanical system; whereas both Williamson and Westphalen use mechanical systems.

SUMMARY OF THE INVENTION

It is considered that the mechanical retraction systems listed above are bulky, and liable to corrosion in a salt water environment. Through development of prior art hydraulic systems, and introducing dual use of components wherever practicable, a hydraulic suspension system may be designed which not only performs well on roads, but also allows the vehicle to be reconfigured to an alternative use, particularly as an amphibious vehicle.

It is an object of the present invention to provide a hydraulic suspension strut which can be used in normal road travel and can also be used to retract a wheel by a greater distance than is appropriate for road travel.

It is a further object of the present invention to provide a hydraulic suspension strut which can be used in normal road travel and can also be used to extend a wheel by a greater distance than is normal for road travel.

It is a further object of the present invention to provide a hydraulic suspension strut which can be used in normal road travel and can also be used either to retract or extend a wheel by a greater distance than is normal for road travel.

The present invention provides a vehicle hydraulic suspension strut which comprises
- a cylinder containing hydraulic fluid
- a piston movable within the cylinder and defining a first chamber and a second chamber within the cylinder
- linkage means for connecting the piston to a load characterised in that
- a first on/off valve is provided to control flow of fluid between the first and second chambers over at least part of the stroke of the piston and the strut further comprises a second on/off valve which is in communication with only one of the first and the second chambers.

In a particularly preferred embodiment, the strut also comprises a gas charged hydraulic accumulator which is in communication with at least one of the said first and second chambers.

The present invention further provides a vehicle hydraulic suspension strut which comprises a cylinder containing hydraulic fluid
- a piston movable within the cylinder and defining a first chamber and a second chamber within the cylinder
- linkage means for connecting the piston to a load
- and a gas charged hydraulic accumulator in communication with said second chamber characterised in that
- a first on/off valve is provided to control the flow of fluid between the first and second chambers over at least part of the stroke of the piston and the strut further comprises a further on/off valve which is in communication with the first chamber only.

The present invention further provides a vehicle hydraulic suspension strut which comprises
- a cylinder containing hydraulic fluid
- a piston movable within the cylinder and defining a first chamber and a second chamber within the cylinder
- linkage means for connecting the piston to a load
- and a gas charged hydraulic accumulator in communication with one of said first and second chambers characterised in that
- a first on/off valve is provided to control the flow of fluid between the first and second chambers over at least part of the stroke of the piston and the strut further comprises a further on/off valve which is in communication with the second chamber only and the gas charged hydraulic accumulator is in communication with the first chamber.

The present invention further provides a vehicle hydraulic suspension strut which comprises
- a cylinder containing hydraulic fluid
- a piston movable within the piston
- linkage means for connecting the piston to a load characterised in that
- the piston is movable within the cylinder between a first extreme position defining a first pair of first and second chambers within the cylinder and a second extreme position defining second pair of first and second chambers within the cylinder; the strut further comprising an on/off valve controlling flow of fluid between the first and second chambers in one of the extreme positions of the piston, a further on/off valve controlling flow of fluid between the first and second chambers in the other of the extreme positions of the piston, and third and fourth on/off valves, each of which is in communication only to one of the first and second chambers respectively.

In a preferred embodiment of a hydraulic suspension strut according to the present invention, the on/off valve or valves allowing flow of fluid between the first and second chambers, is located in a hydraulic transfer line externally of the cylinder.

BRIEF DESCRIPTION OF THE DRAWINGS

Several embodiments of the invention will now be described with reference to the accompanying drawings in which.

Figure 1:
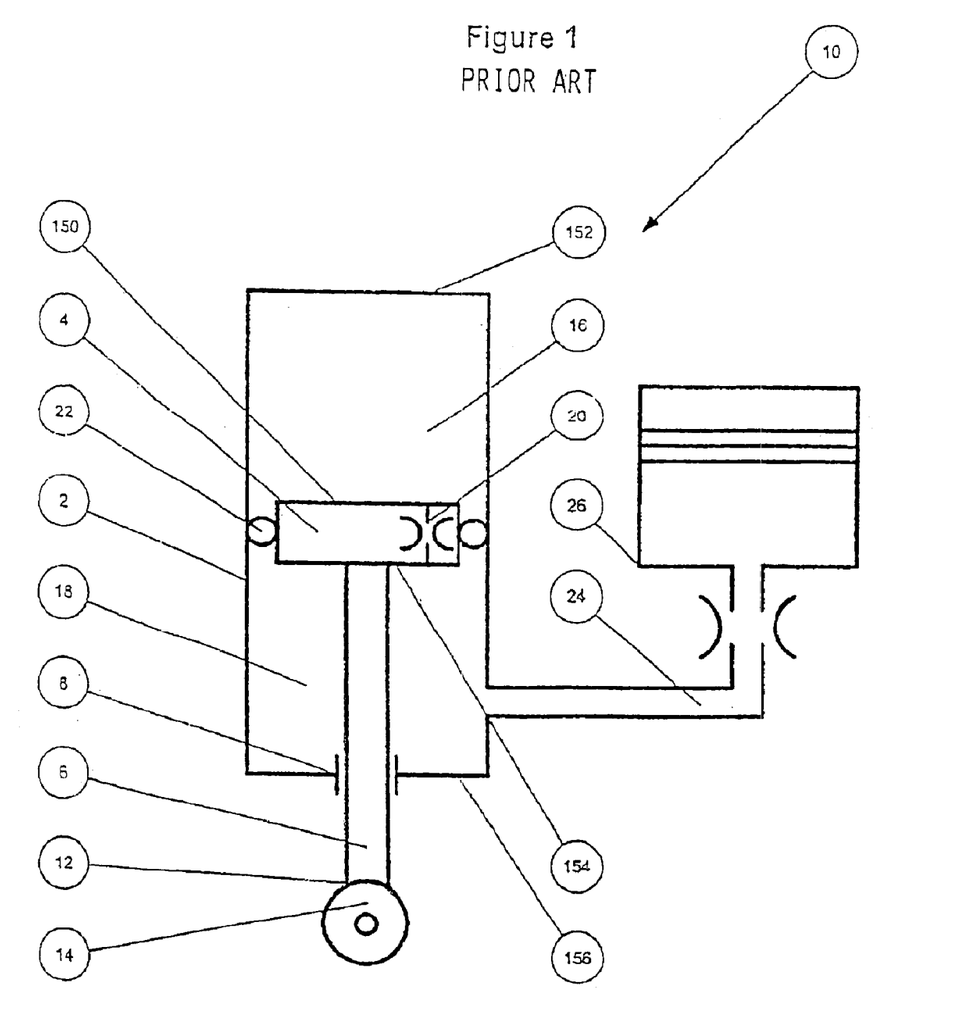
FIG. 1 is a view of a known hydraulic suspension strut.

As can be seen from FIG. 1, a known hydraulic suspension strut shown generally at 10 comprises a cylinder 2 and a piston 4 movable axially within the cylinder. A linkage rod 6 is attached to one face of the piston 4 and extends through a sealed aperture 8 in the base of the cylinder 2. The linkage rod 6 terminates at the end 12 remote from the piston 4 in a mount 14.

The piston 4 defines first and second chambers 16, 18 in the cylinder 2, and a restricter/damper valve 20 is provided in the piston 4. A seal 22 is provided on the circumference of the piston 4. The first and second chambers 16, 18 are filled with hydraulic fluid.

A hydraulic line 24 leaves the cylinder 2 from the side wall thereof close to the base of the cylinder 2 and terminates in a gas charged hydraulic accumulator 26.

In use, a wheel (not shown) is linked to the linkage rod 6 via the mount 14 and the cylinder 2 is attached to the vehicle body (not shown).

As the wheel encounters irregularities in the road surface on which the vehicle provided with the suspension strut is being driven, the piston 4 moves axially within the cylinder 2.

As the vehicle moves over, in particular, rough terrain, excessive oscillation of the vehicle is obviated because of the damping effect of the valve 20 and gas charged hydraulic accumulator 26.

In the hydraulic suspension strut shown in FIG. 1, the total amount of travel of the piston 4, and hence the wheel, in the vertical direction, is limited by engagement of the upper face 150 of the piston 4 with the inner surface of the upper end wall 152 of the cylinder 2 and by engagement of the lower face 154 of the piston 4 with the inner surface 156 of the base of the cylinder 2. A bump stop (not shown) may be provided to limit the total amount of travel of the piston 4.

Figure 2:
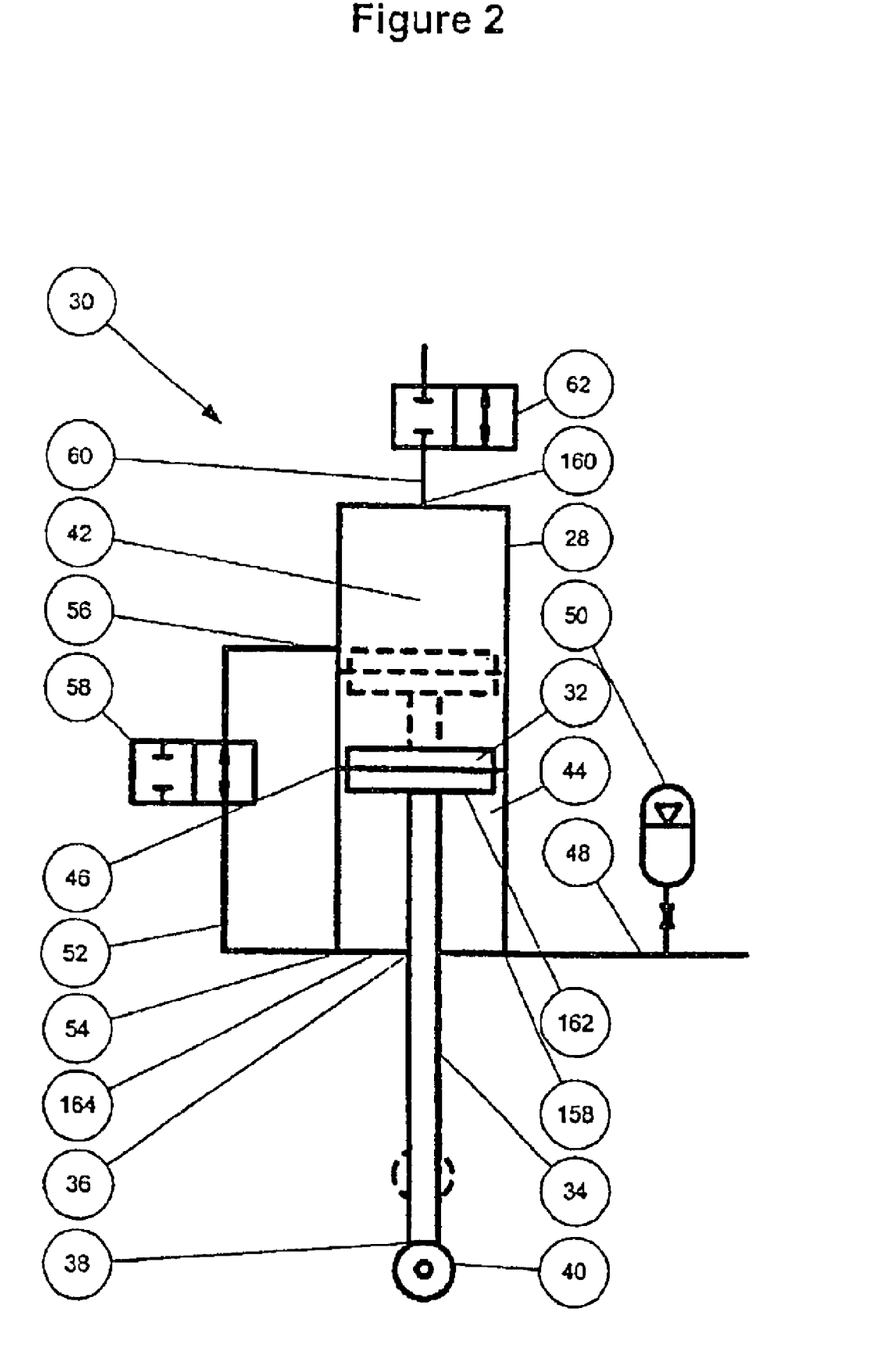
FIG. 2 is a view of a first embodiment of a hydraulic suspension strut which can be used in a first mode, for normal travel, and a second mode for wheel retraction, shown in the road travel mode.

A first embodiment of an hydraulic suspension strut in accordance with the invention is shown generally at 30 in FIG. 2. The strut 30 comprises a cylinder 28 and a piston 32 moveable axially within the cylinder. A linkage rod 34 is attached to one face of the piston 32 and extends through a sealed aperture 36 in the base of the cylinder 28. The linkage rod 34 terminates at the end 38 remote from the piston 32 in a mount 40.

The piston 32 defines first and second chambers 42, 44 in the cylinder 28. A seal 46 is provided on the circumference of the piston 32. The first and second chambers 42, 44 are filled with hydraulic fluid.

A line 48 leaves the cylinder 28 from a port 158 in the side wall of the cylinder 28 close to the base thereof and connects to a gas charged hydraulic accumulator 50 and to the hydraulic system of the vehicle, which system includes a source of hydraulic pressure and a hydraulic fluid reservoir (not shown).

DESCRIPTION OF THE PREFERRED EMBODIMENT

A hydraulic transfer line 52 is provided external to the cylinder 28 and connects first and second ports 54, 56 in the side wall of the cylinder. The first port 54 is located in the side wall close to the base of the cylinder 28, whilst the second port 56 is located in the side wall at approximately the mid-point of the cylinder 28. A first on/off valve 58 is provided in the transfer line 52.

In an alternative embodiment, the first port 54 could be provided in the end wall at the base of the cylinder.

A further hydraulic line 60 extends from a port 160 in the upper wall of the cylinder 28 and is controlled by a second on/off valve 62. The further line 60 is connected to the hydraulic system of the vehicle.

In use, a wheel (not shown) is linked to the linkage rod 34 via the mount 40 and the cylinder 28 is attached to the vehicle body (not shown).

In road travel mode, as the wheel encounters irregularities in the road surface on which the vehicle provided with the suspension strut is being driven, the piston 32 moves axially within the cylinder 28.

As the vehicle moves over, in particular, rough terrain, excessive oscillation of the vehicle is obviated because of the damping effect of the strut and the gas charged hydraulic accumulator 50.

The hydraulic suspension strut shown in FIG. 2 is shown in road travel mode. The first on/off valve 58 in the transfer line 52 is open allowing a restricted flow of fluid between the first and second chambers and the second on/off valve 62 in the top line 60 is closed. The total amount of travel of the piston 32, and hence the wheel, in the vertically upwards direction, is shown in chain dotting. When the piston 32 is in the position shown in chain dot, the port 56 is closed by the piston 32 and further movement of the piston upwards in the cylinder is prevented by the volume of hydraulic fluid in the first chamber 42 thus providing a hydraulic stop. Movement of the piston 32 in the vertically downwards direction is limited by engagement of the lower face 162 of the piston 32 with the inner surface of the base 164 of the cylinder 28.

Figure 3:
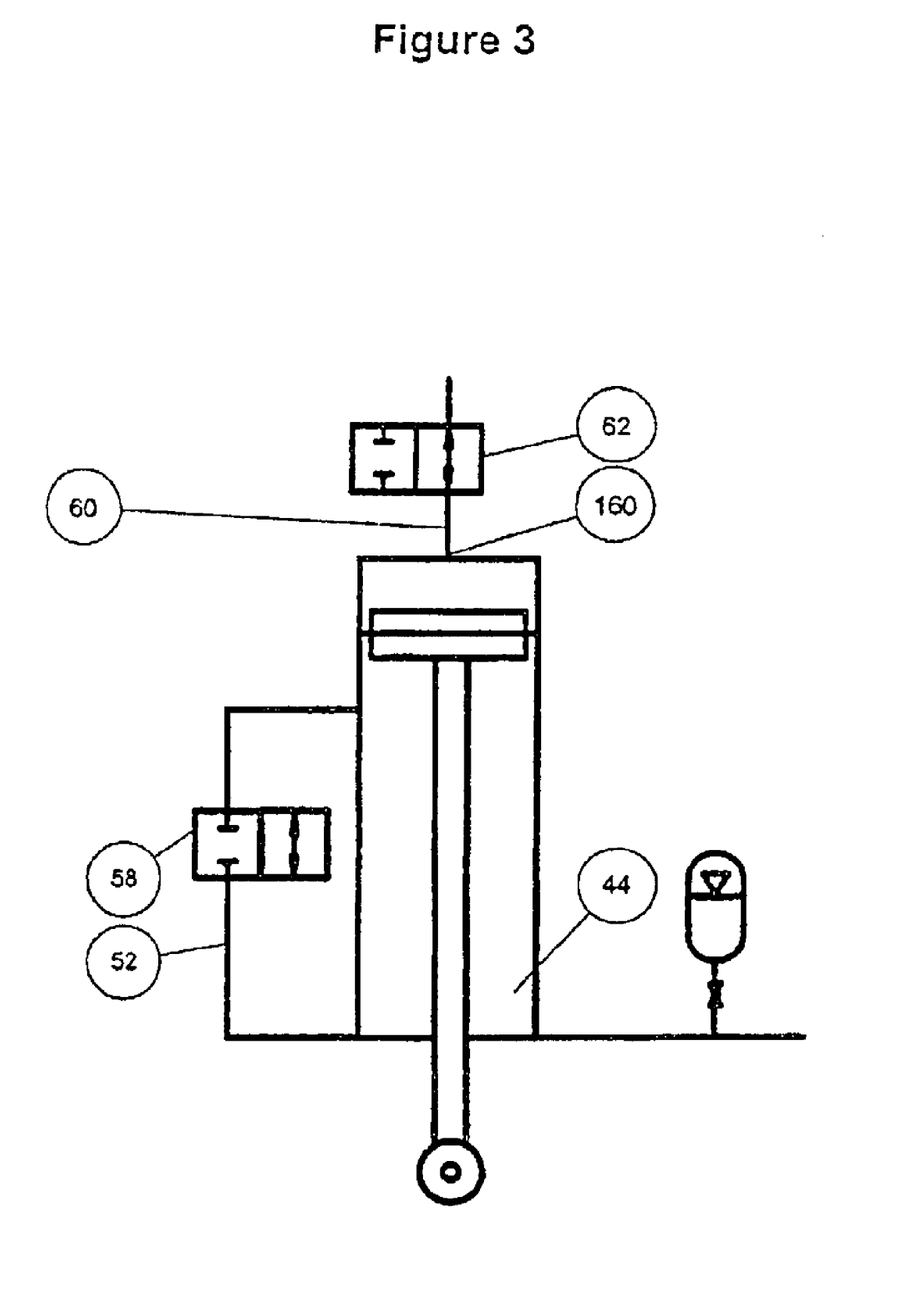
FIG. 3 is a view of the hydraulic suspension strut of FIG. 2 in the mode for wheel retraction.

In FIG. 3, the strut is shown in wheel retraction mode. The first on/off valve 58 in the transfer line 52 is closed and the second on/off valve 62 in the top line 60 is open. In this condition, the strut can now act as a hydraulic actuator and may be used to retract the wheel beyond its normal travel by fluid being pumped into the lower chamber 44 and exhausted through the upper port 160.

To return the wheel to its normal operating condition, the strut is actuated in reverse with fluid being pumped into the upper chamber 42 through the upper port 160 and exhausted from the lower chamber. Once the piston 32 has moved to a position below the port 56, the valve 62 can be closed and the valve 58 opened so that the strut can again provide suspension and damping for the wheel.

It should be noted that the term 'on/off valve' is used herein to denote a valve that when open allows flow through the valve in either direction and when closed prevents fluid from flowing through the valve in either direction. In a preferred embodiment, the on/off valves 58, 65 are spool valves which may be operated hydraulically, electronically or manually. However, any suitable type of valve may be used.

Figure 4:
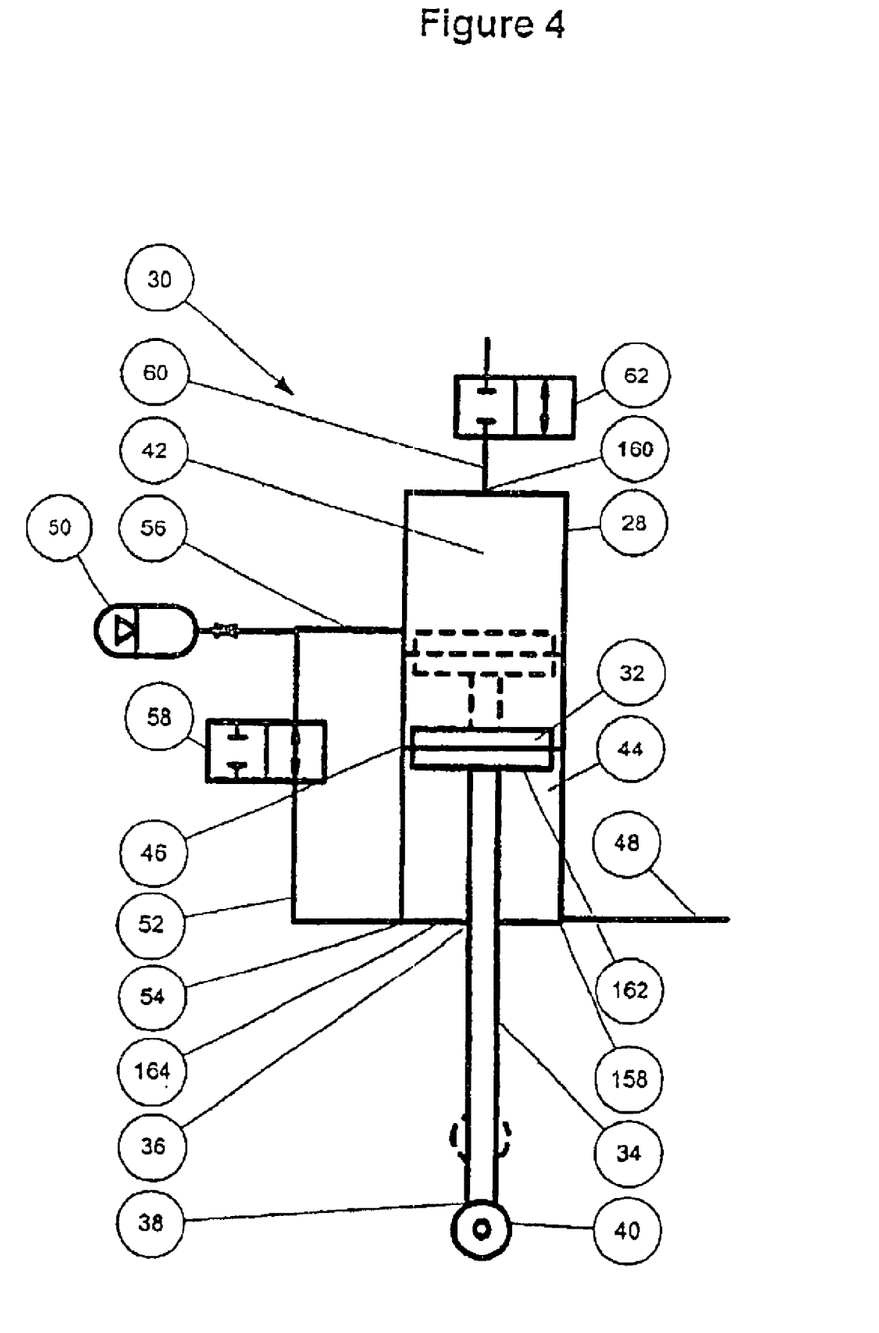
FIG. 4 is a view showing a modification to the hydraulic suspension strut of FIG. 2, with the accumulator mounted in an alternative position.

FIG. 4 shows a modification to the strut 30 of FIG. 2. In the modified strut 30 of FIG. 4, the hydraulic accumulator is in communication with one of the branches of the transfer line 52 between the first and second chambers 42, 44. In all other respects, the hydraulic strut 30 of FIG. 4 is the same as the strut 30 as shown in FIG. 2 and can be operated in the same manner in both road travel and wheel retraction modes.

Figure 5:
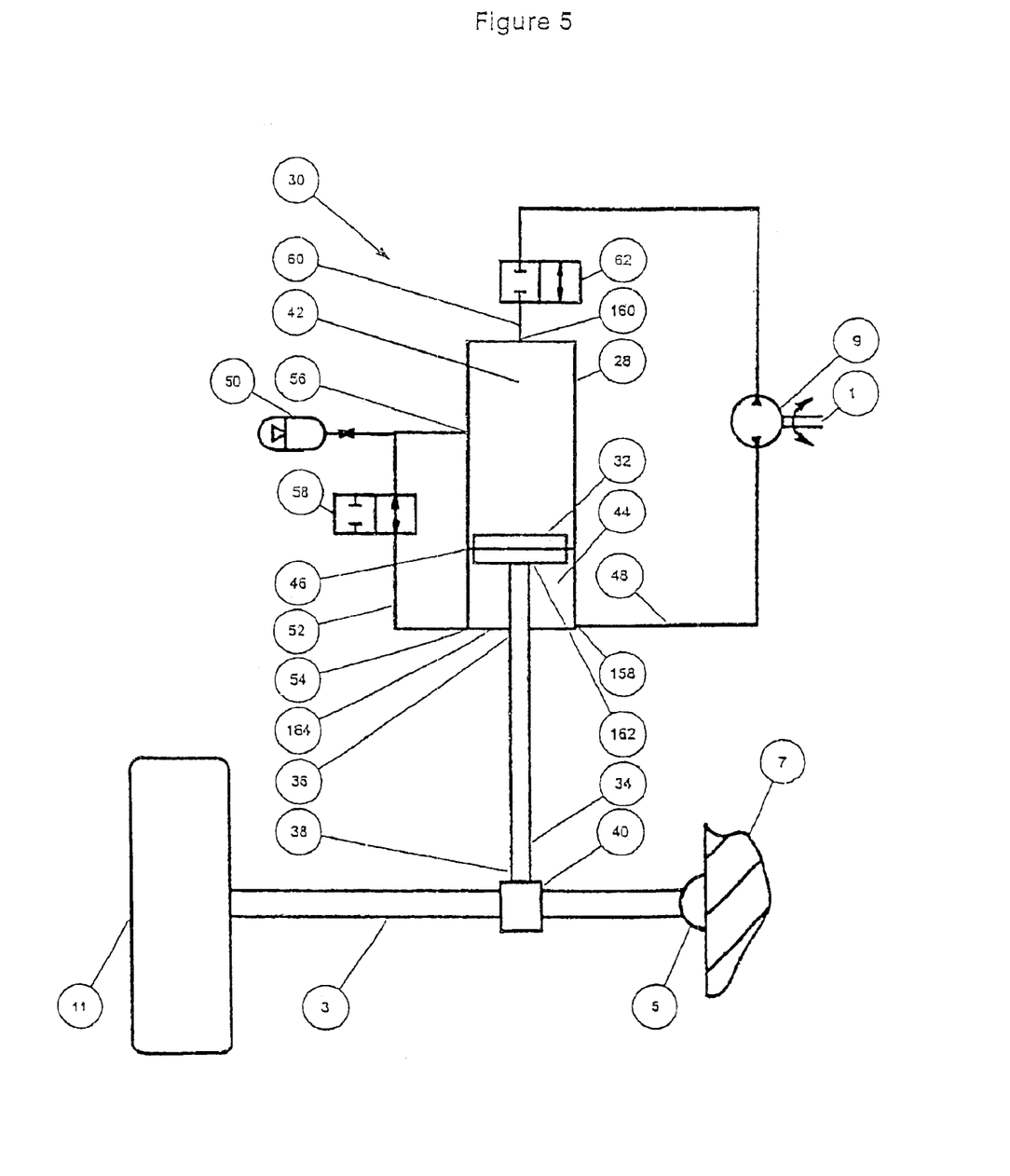
FIG. 5 is a schematic diagram of a vehicle wheel suspension installation using a strut as shown in FIG. 3.

FIG. 5 shows a diagrammatic view of a vehicle installation of a hydraulic strut according to FIG. 4. Wheel 1 is mounted on a suspension arm 3 which is attached at mounting point 5 to a chassis member 7. It will be appreciated that a similar chassis mounting will be required for the top of the suspension strut; this is however not shown, to enable the hydraulic circuits to be clearly shown. The piston linkage rod 34 is flexibly attached to the suspension arm 3 by a mount 40, which may comprise a bush (not shown).

Hydraulic lines 48 and 160 (through valve 62) are both connected to a pump 9, driven by shaft 1. This pump may be reversible, as shown; or unidirectional; and may be driven directly by the vehicle engine, or by an electric motor. If a unidirectional pump is used, valves (not shown) must be used to reverse direction of fluid flow as required.

Thus it can be seen that in a road travel mode, movement of the suspension arm 3, caused as the wheel 11 goes over irregularities on the road surface, will be transferred to the piston 32 through the mount 40 and the linkage rod 34. This movement will be damped by the strut 30 in a conventional manner. When the strut 30 is operated in the wheel retraction mode, the pump 9 can be selectively connected to one of the chambers 42, 44 causing the piston to move within the cylinder. This movement is translated into pivotal movement of the suspension arm 3, and so into movement of the wheel 11, through the linkage rod 34 and the mount 40.

Figure 6:
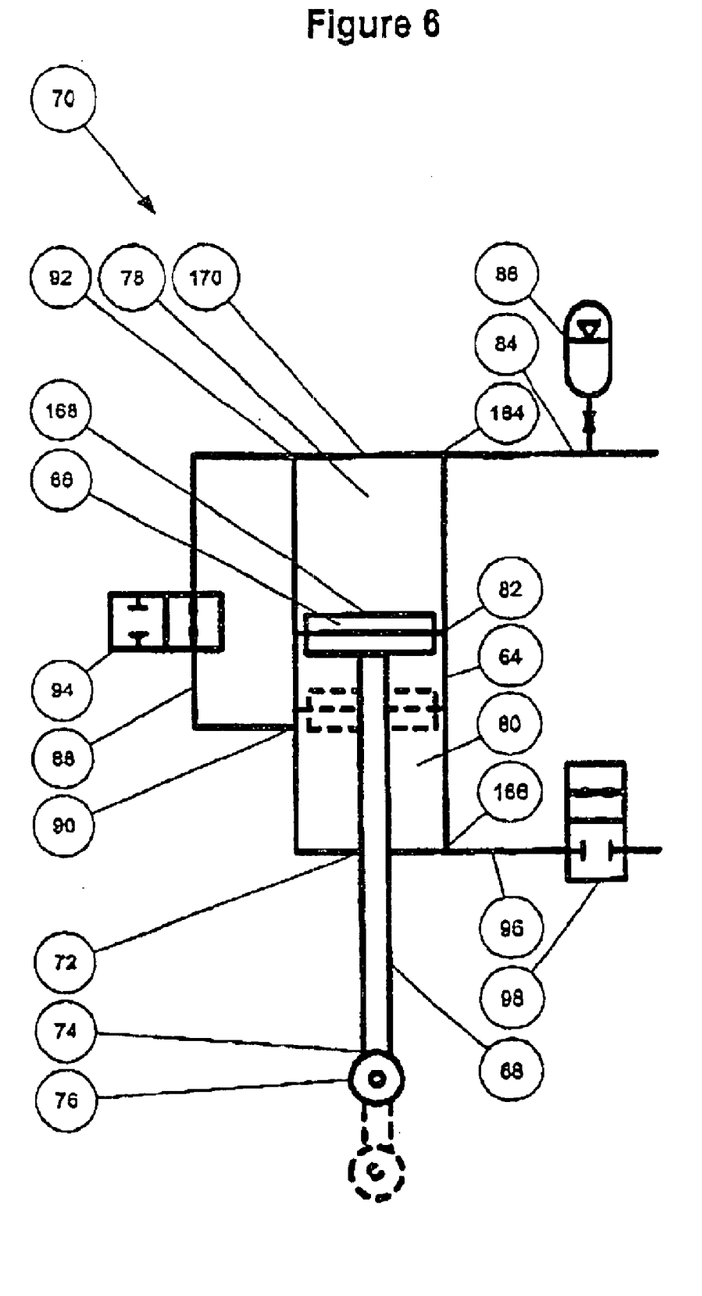
FIG. 6 is a view of a second embodiment of a hydraulic suspension strut which can be used in a first mode, for normal travel, and a second mode for wheel extension, shown in the road travel mode.

As can be seen from FIG. 6, an alternative embodiment of a hydraulic suspension strut shown generally at 70 comprises a cylinder 64 and a piston 66 moveable axially within the cylinder 64. A linkage rod 68 is attached to one face of the piston 66 and extends through a sealed aperture 72 in the base of the cylinder 64. The linkage rod 68 terminates at the end 74 remote from the piston 66 in a mount 76.

The piston 66 defines first and second chambers 78, 80 in the cylinder 64. A seal 82 is provided on the circumference of the piston 66. The first and second chambers 78, 80 are filled with hydraulic fluid.

A hydraulic line 84 leaves the cylinder 64 from a port 164 in the side wall of the cylinder 64 close to the top thereof and connects to a gas charged hydraulic accumulator 86 and the hydraulic system of the vehicle (not shown). In an alternative arrangement, the port 164 could be provided in the end wall at the top of the cylinder.

A hydraulic transfer line 88 is provided external to the cylinder 64 and connects first and second ports 90, 92 in the walls of the cylinder. The first port 90 is located in the side wall of the cylinder at approximately the mid-point of the cylinder 64, whilst the second port 92 is located close to the top of the cylinder 64. A first on/off valve 94 is provided in the transfer line 88.

In an alternative arrangement, the second port 92 could be provided in an end wall at the top of the cylinder.

A further hydraulic line 96 extends from a port 166 in the side wall close to the base of the cylinder 64 and is controlled by a second on/off valve 98. The further hydraulic line 96 is connected to the hydraulic system of the vehicle (not shown).

In use, a wheel (not shown) is mounted on the linkage rod 68 via the mount 76.

As the wheel encounters irregularities in the road surface on which the vehicle provided with the suspension strut is being driven, the piston 66 moves axially within the cylinder 64.

As the vehicle moves over, in particular, rough terrain, excessive oscillation of the vehicle is obviated because of the damping effect of the strut and the gas charged hydraulic accumulator 86.

The hydraulic suspension strut shown in FIG. 6 is shown in road travel mode. The first on/off valve 94 in the transfer line 88 is open and the second on/off valve 98 in the lower line 96 is closed. The total amount of travel of the piston 66, and hence the wheel, in the vertically upwards direction, is limited by engagement of the upper face 168 of the piston 66 with the inner surface of the upper end wall 170 of the cylinder 64. The limit of travel in the vertically downwards direction is shown in chain dot and is limited by the volume of hydraulic fluid in the second chamber 80 when the piston 66 closes off the port 90, thus providing a hydraulic stop.

It should be noted that the accumulator 86 shown in this Figure may be mounted on a branch of the transfer line 88, in a fashion similar to that shown in FIG. 4.

Figure 7:
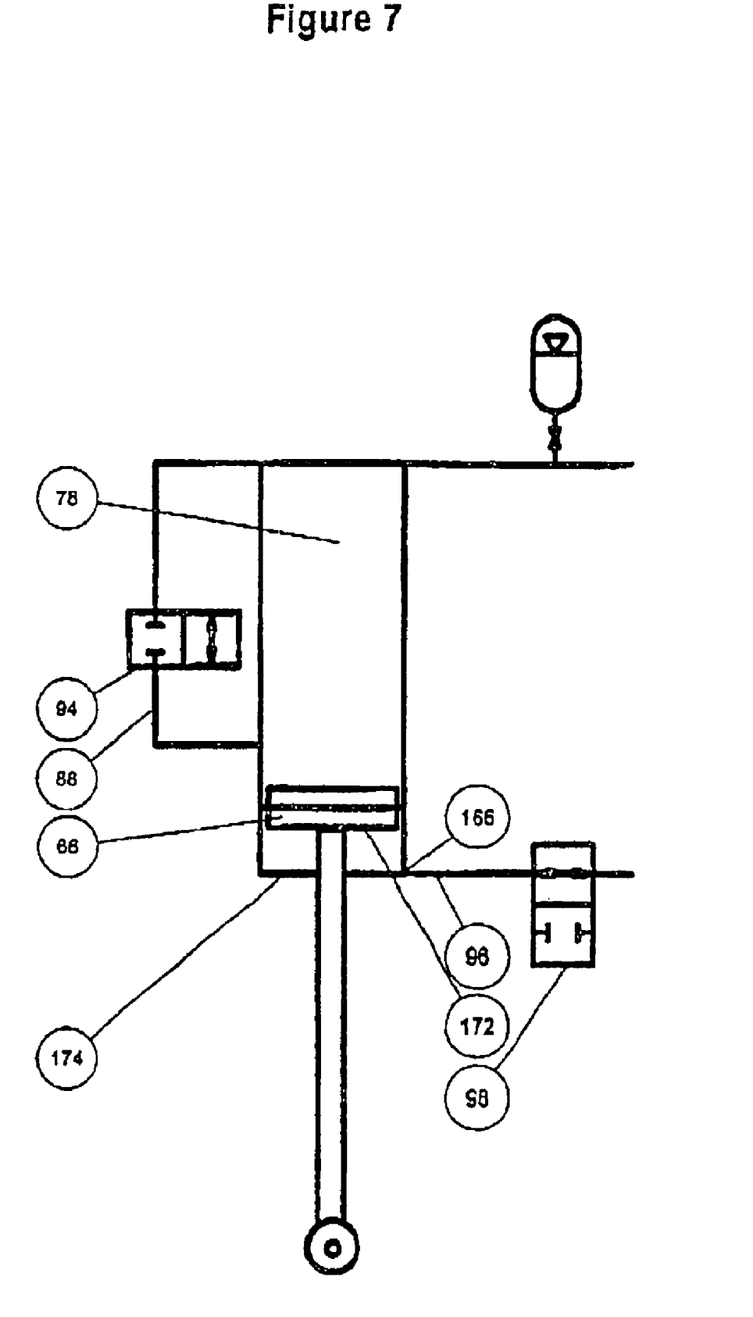
FIG. 7 is a view of the hydraulic suspension strut of FIG. 6 in the mode for wheel extension.

In the view shown in FIG. 7, the strut is shown in wheel extension mode. The first on/off valve 94 in the hydraulic transfer line 88 is closed and the second on/off valve 98 in the lower line 96 is open. In this condition, the strut now acts as a hydraulic actuator and may be used to extend the wheel beyond its normal travel by fluid being pumped into the upper chamber 78 and exhausted through the lower port 166. Vertically downwards movement of the piston 66 being limited by engagement of its lower face 172 with the inner surface of the base 174 of the cylinder 64.

To return the wheel to its normal operating condition, actuation of the strut is reversed, with fluid being pumped into the lower chamber 80 and exhausted from the upper chamber 78.

Once the piston has moved above the port 90, the valve 98 can be closed and the valve 94 opened so that the strut will again operate to provide suspension and damping for the wheel.

Figure 8:
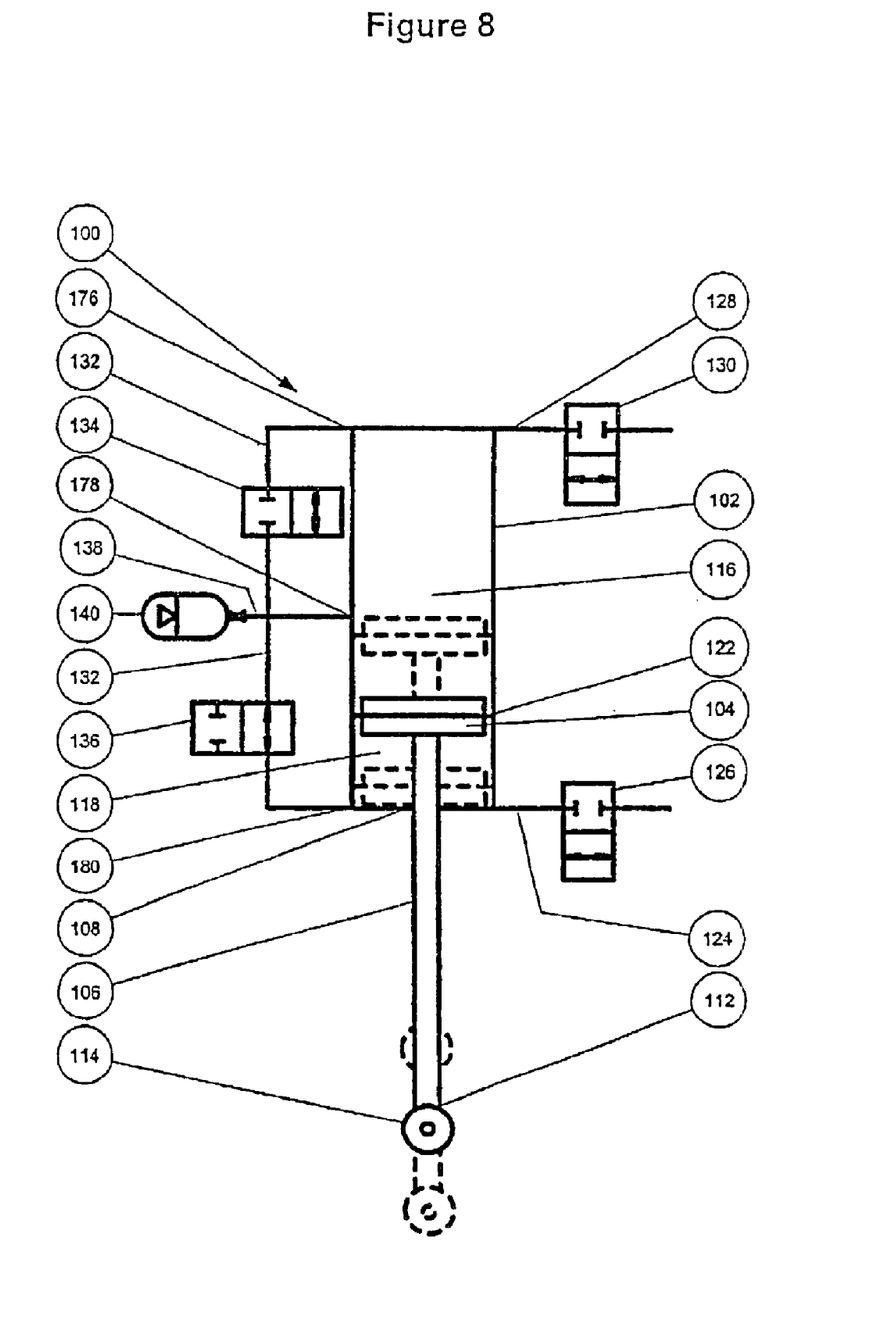
FIG. 8 is a view of a third embodiment of a hydraulic suspension strut which can be used in a first mode, for normal travel, a second mode for wheel retraction, and a third mode for wheel extension, shown in a mode where compression travel is limited.

As can be seen from FIG. 8, a further embodiment of a hydraulic suspension strut, shown generally at 100 comprises a cylinder 102 and a piston 104 moveable axially within the cylinder. A linkage rod 106 is attached to one face of the piston 104 and extends through a sealed aperture 108 in the base of the cylinder 102. The linkage rod 106 terminates at the end 112 remote from the piston 104 in a mount 114.

The piston 104 defines first and second chambers 116, 118 in the cylinder 102. A seal 122 is provided on the circumference of the piston 104. The first and second chambers 116, 118 are filled with hydraulic fluid.

An hydraulic transfer line 132 is provided external to the cylinder 102 and is attached at a port 176 close to the top of the cylinder 102, a port 178 at about the mid-point of the cylinder 102 and a port 180 close to the base thereof. A first on/off valve 136 is provided in the hydraulic line between the ports 178 and 180 and a further on/off valve, known as a third on/off valve, 134 is provided in the hydraulic line between the ports 176 and 178.

A second hydraulic line 138 branches from the line 132 between the first and third on/off valves 136, 134 and terminates in a gas charged hydraulic accumulator 140.

A third hydraulic line 124 leaves the cylinder 102 from the side wall thereof close to the base of the cylinder 102 and connects to an on/off valve 126, known as a fourth on/off valve, and to the hydraulic system of the vehicle (not shown).

A fourth hydraulic line 128 leaves the cylinder 102 from the side wall thereof close to the top of the cylinder 102 and connects to an on/off valve 130, known as a second on/off valve, and the hydraulic system of the vehicle (not shown).

In use, a wheel (not shown) is linked to the linkage rod 106 via the mount 114 and the cylinder 102 is attached to the vehicle body (not shown).

As the wheel encounters irregularities in the road surface on which the vehicle provided with the suspension strut is being driven, the piston 104 moves axially within the cylinder 102.

As the vehicle moves over, in particular, rough terrain, excessive oscillation of the vehicle is obviated because of the damping effect of the strut and the gas charged hydraulic accumulator 140.

The hydraulic suspension strut shown in FIG. 8 is shown in a mode where compression travel is limited, for example to prevent grounding over rough terrain due to excessive wheel travel. The fourth on/off valve 126 in the hydraulic line 124 is closed and the first on/off valve 136 in the hydraulic line 132 is open. The second on/off valve 130 in the hydraulic line 128 and the third on/off valve 134 in the hydraulic line 132 are closed. The total amount of travel of the piston 104, and hence the wheel, in the vertically upwards direction, is shown in chain dotting and is limited to the level of the port 178 by the volume of hydraulic fluid trapped in the first chamber 116 when the piston 104 covers the port 178. The total amount of travel of the piston 104 in the vertically downwards direction is shown in chain dotting and is limited by engagement with the base of the cylinder 102.

Figure 9:
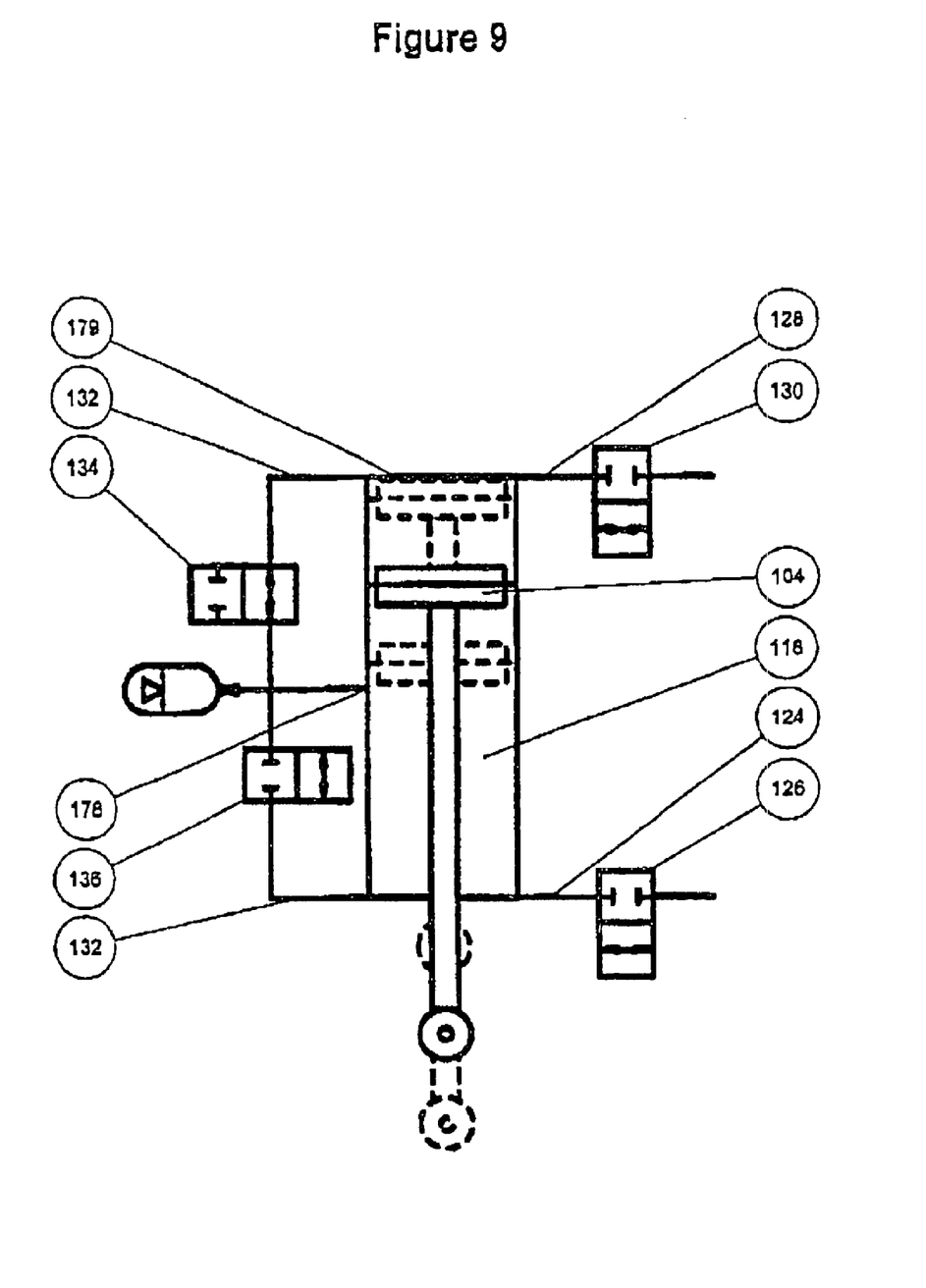
FIG. 9 is a view of the hydraulic suspension strut of FIG. 8 in a mode where extension travel is limited.

If it is intended to use the embodiment of the hydraulic suspension strut according to FIG. 8 in a mode where extension travel is limited, for example on a road-going vehicle which only uses extra ground clearance at low speed, then the strut should be operated as shown in FIG. 9. In this arrangement, the fourth on/off valve 126 in the line 124 and the first on/off valve 136 in the line 132 are closed. The second on/off valve 130 in the line 128 is closed and the third on/off valve 134 in the line 132 is open.

The total amount of travel of the piston 104, and hence the wheel, in the vertically upwards direction, is shown in chain dotting and is limited by engagement of the upper face of the piston with the inner surface of the upper end wall 179 of the cylinder 102. The total amount of travel of the piston 104 in the vertically downwards direction is shown in chain dotting and is limited to the level of the port 178 by the volume of hydraulic fluid trapped in the second chamber 118 when the piston covers the port 178.

Figure 10:
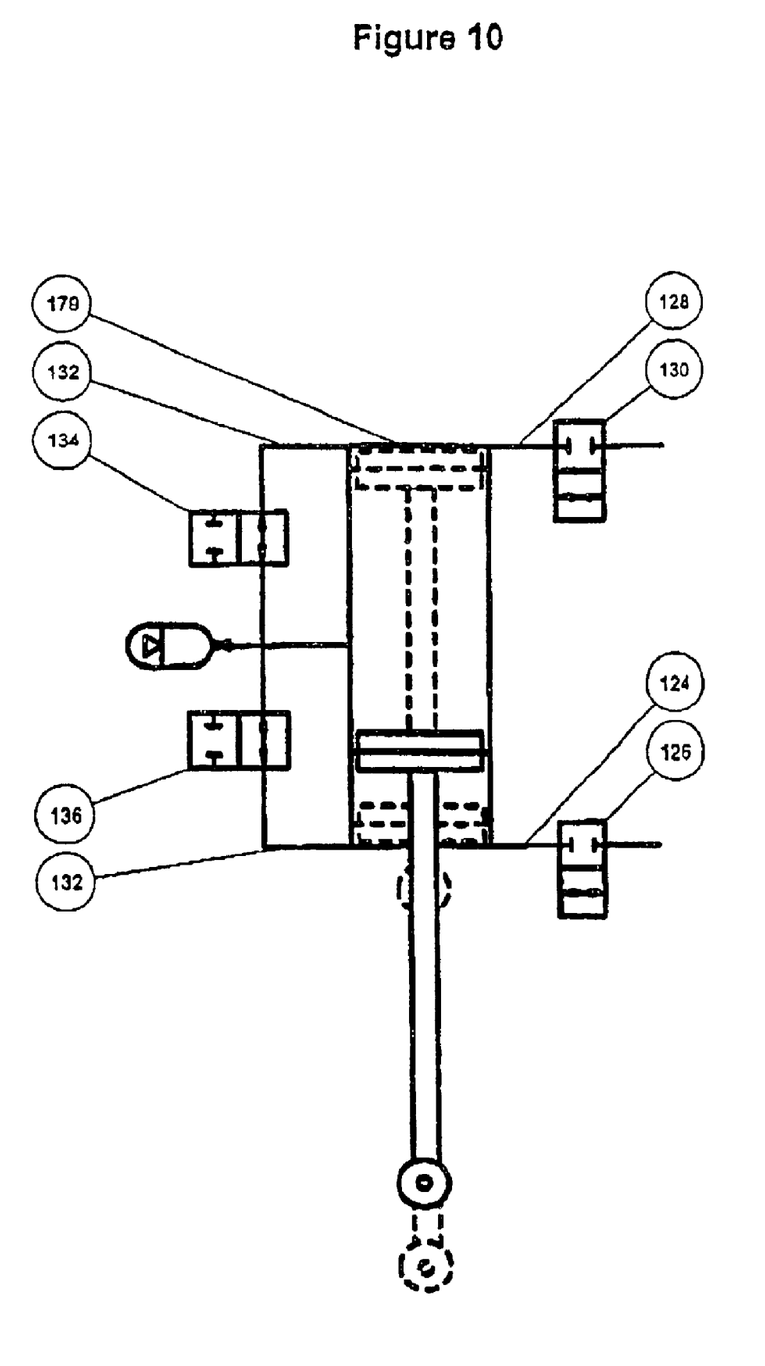
FIG. 10 is a view of the hydraulic suspension strut of FIG. 8 in a mode where travel is not limited.

If it is intended to use the embodiment of the hydraulic suspension strut according to FIG. 8 in a mode where travel is not hydraulically limited, then the strut should be operated as shown in FIG. 10. In this arrangement, the on/off valve 126 in the line 124 is closed and the on/off valve 136 in the line 132 is open. The on/off valve 130 in the line 128 is closed and the on/off valve 134 in the line 132 is open. The total amount of travel of the piston 104 is limited by engagement with the inner surface of the upper end wall 179 of the cylinder 102 in the vertically upwards direction and by engagement with the base of the cylinder 102 in the vertically downwards direction.

Figure 11:
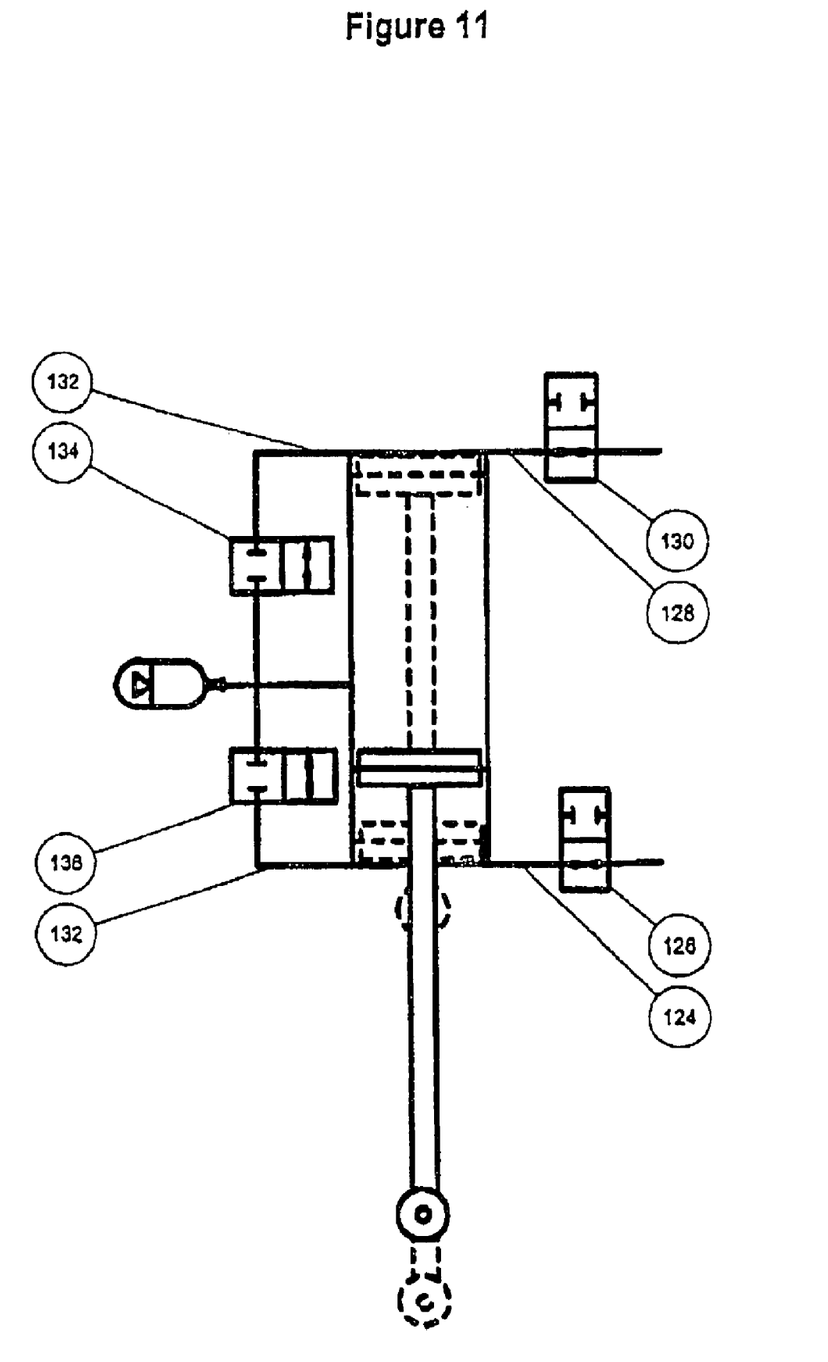
FIG. 11 is a view of the hydraulic suspension strut of FIG. 8 where the position of the strut can be controlled to either extend or retract the strut.

If it is intended to use the embodiment of the hydraulic suspension strut according to FIG. 8 in a mode where the position of the strut can be controlled to either extend or contract the strut and hence raise or lower the vehicle, for example so that it kneels, then the strut should be operated as shown in FIG. 11. In this arrangement, the fourth on/off valve 126 in the line 124 is open and the first on/off valve 136 in the line 132 is closed. The second on/off valve 130 in the line 128 is open and the third on/off valve 134 in the line 132 is closed. By causing fluid to enter along line 124 and exit via line 128 the strut will be made to contract. Similarly, by causing fluid to enter along line 128 and exit via line 124 the strut will be made to extend.

In an alternative arrangement of the hydraulic suspension strut, the vehicle body (not shown) may be linked to the linkage rod via the mount and the wheel (not shown) may be attached to the cylinder.

All hydraulic valves described above may be, for example, spool or poppet valves. They may be operated by solenoids or motors, or manually. If the valves are operated manually, it may be convenient to use pilot operated valves. Furthermore, the various hydraulic lines may be connected to the chambers within the cylinder by means of ports located in side wall or the end walls of the cylinder as appropriate.

An hydraulic suspension strut in accordance with the invention can have particular application in an amphibious vehicle. It is known for amphibious vehicles to have wheels mounted so that they can be moved from a protracted position in which they are arranged to support the vehicle for use on land, in a manner similar to a wheel on a conventional motor vehicle, to a retracted position in which the wheels are elevated relative to the body of the vehicle for use on water. A hydraulic suspension strut in accordance with the present invention can be connected to a wheel of such an amphibious vehicle such that with the strut in road travel mode it provides damping and/or suspension for the wheel when the vehicle is used on land. However, when the vehicle is used in water, the strut can be used in retraction or extension mode to move the wheel between its protracted and retracted positions. Moreover, the control system for retraction and extension of the strut may be linked to other control mechanisms for conversion of the vehicle between road mode and marine mode.

It should be noted that different wheels or different axles of an amphibian vehicle may have different suspension retraction requirements. For example Westphalen, in U.S. Pat. No. 4,241,686 referenced above, retracts front wheels into closed pod areas; but simply retracts rear wheels into an open, recessed area above the propeller level. Also, U.S. Pat. No. 4,008,679 (Bozzano) discloses an amphibious vehicle using a combination of caterpillar tracks and individual wheels. Hence, it will be understood that the hydraulic suspension strut of the invention may be applied to a single wheel of a three-wheeled vehicle; or to a single axle of a four-wheeled vehicle; or to all wheels as required. Although described with reference to an amphibious vehicle, the suspension strut could have other applications to reconfigurable vehicles.

Although in all the embodiments shown the strut is connected to a gas charged hydraulic accumulator, this need not be the case and alternative means of providing a spring effect can be used. For example the strut could be hydraulically connected to a piston which is acted upon by a resilient member, such as a spring. Alternatively the strut could be used in combination with a conventional mechanical spring arrangement for a vehicle.

What is claimed is:

1. An amphibious vehicle having at least one wheel moveable from a protracted position, in which the wheel is arranged to support the vehicle for use on land, to a retracted position, in which the wheel is elevated relative to a body of the vehicle for use of the vehicle on water, the vehicle further having a hydraulic strut comprising: a cylinder containing hydraulic fluid, a piston movable within the cylinder and defining a first chamber and a second chamber within the cylinder, a linkage means for connecting the piston to a suspension linkage associated with the wheel, a first on/off valve for controlling flow of fluid between the first and second chambers over at least part of the stroke of the piston, and a second on/off valve in communication with only one of the first and the second chambers; characterised in that: with the first valve open and the second valve shut, the strut is adapted to provide suspension and/or damping for the wheel; and with the first valve shut and the second valve open, the strut is adapted to operate as an actuator for moving the wheel between the protracted and retracted positions.

2. An amphibious vehicle as claimed in claim 1, characterised in that, a gas charged hydraulic accumulator is in communication with at least one of said first and second chambers.

3. An amphibious vehicle as claimed in claim 2, characterised in that, the gas charged accumulator is in communication with both the first and second chambers when the first on/off valve controlling flow between the first and second chambers is open, and is in communication only with said one of the first and second chambers, to which the second on/off valve is in communication, when the first on/off valve controlling flow between the chambers is closed.

4. An amphibious vehicle as claimed in claim 2, characterised in that, the gas charged accumulator is in communication with both the first and second chambers when the first on/off valve controlling flow between the first and second chambers is open, and in communication only with the other of said first and second chambers, to which the second on/off valve is not in communication, when the first on/off valve controlling flow between the chambers is closed.

5. An amphibious vehicle as claimed in claim 1, characterised in that, the first on/off valve controls flow of fluid between the first and second chambers over a first part of the stroke of the piston, and a third on/off valve is provided to control flow of fluid between the first and second chambers over a second part of the stroke of the piston, a fourth on/off valve being in communication only with the other of the first and second chambers to which the second on/off valve is not in communication.

6. An amphibious vehicle as claimed in claim 1, characterised in that the on/off valve controlling flow of fluid between the first and second chambers is located externally of the cylinder.

7. An amphibious vehicle as claimed in claim 6, characterised in that the on/off valve or valves are located in a hydraulic transfer connecting the first and second chambers.

8. An amphibious vehicle as claimed in claim 7, characterised in that the hydraulic transfer line connects two or more ports located in the walls of the cylinder.

9. An amphibious vehicle as claimed in claim 1, characterised in that the travel of the piston within the cylinder is limited by the volume of the hydraulic fluid in the first chamber when an on/off valve which is in communication only with the first chamber is closed.

10. An amphibious vehicle as claimed in claim 1, characterised in that, the travel of the piston within the cylinder is limited by the volume of the hydraulic fluid in the second chamber when an on/off valve which is in communication only with the second chamber is closed.

11. An amphibious vehicle as claimed in claim 1, characterised in that, the travel of the piston within the cylinder is limited by the volume of the hydraulic fluid in the first chamber when an on/off valve which is in communication only with the first chamber is dosed and by the volume of the hydraulic fluid in the second chamber when an on/off valve which is in communication only with the second chamber is closed.

12. An amphibious vehicle as claimed in claim 2, characterised in that, the first on/off valve controls flow of fluid between the first and second chambers over a first part of the stroke of the piston, and a third on/off valve is provided to control flow of fluid between the first and second chambers over a second part of the stroke of the piston, a fourth on/off valve being in communication only with the other of the first and second chambers to which the second on/off valve is not in communication.

13. An amphibious vehicle as claimed in claim 12, characterised in that, the gas charged accumulator is in communication with both the first and second chambers when either or both of the first or the third on/off valves controlling flow between the first and second chambers is open, and is in communication only with one of the first and second chambers when both the first and third on/off valves controlling flow between the chambers are closed.

* * * * *